(12) United States Patent
Suzuki et al.

(10) Patent No.: US 8,386,796 B2
(45) Date of Patent: Feb. 26, 2013

(54) INFORMATION PROCESSING APPARATUS AND INFORMATION MANAGEMENT METHOD

(75) Inventors: Masato Suzuki, Kawasaki (JP); Seigo Kotani, Kawasaki (JP); Keishiro Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 12/382,685

(22) Filed: Mar. 20, 2009

(65) Prior Publication Data
US 2009/0240950 A1 Sep. 24, 2009

Related U.S. Application Data

(63) Continuation of application No. PCT/JP2006/318637, filed on Sep. 20, 2006.

(51) Int. Cl.
*G06F 21/00* (2006.01)
(52) U.S. Cl. .......................................... 713/186; 713/181
(58) Field of Classification Search .................. 713/186, 713/172, 176, 180, 181
See application file for complete search history.

(56) References Cited

U.S. PATENT DOCUMENTS

| | | | |
|---|---|---|---|
| 5,224,166 A | 6/1993 | Hartman, Jr. | |
| 5,422,953 A | 6/1995 | Fisher | |
| 7,376,844 B2 * | 5/2008 | Feyt | 713/194 |
| 7,676,439 B2 * | 3/2010 | Tattan et al. | 705/67 |
| 2003/0065930 A1 * | 4/2003 | Fukushima | 713/189 |
| 2006/0277414 A1 | 12/2006 | Kotani et al. | |
| 2007/0223704 A1 * | 9/2007 | Brickell et al. | 380/281 |

FOREIGN PATENT DOCUMENTS

| | | |
|---|---|---|
| EP | 1 030 282 A1 | 8/2000 |
| JP | 6-112937 | 4/1994 |
| JP | 7-254897 | 10/1995 |
| JP | 11-88321 | 3/1999 |
| JP | 11-88322 | 3/1999 |
| JP | 11-143833 | 5/1999 |
| JP | 11-282983 | 10/1999 |
| JP | 2002-258745 | 9/2002 |
| JP | 2003-110544 | 4/2003 |
| JP | 2005-109716 | 4/2005 |
| WO | 2005/106620 A1 | 11/2005 |

OTHER PUBLICATIONS

International Search Report issued on Dec. 19, 2006 in corresponding International Patent Application PCT/JP2006/318637.

* cited by examiner

*Primary Examiner* — Edward Zee
(74) *Attorney, Agent, or Firm* — Staas & Halsey LLP

(57) ABSTRACT

An information processing apparatus includes a chip implemented therein to independently perform a predetermined process. The chip includes a storage unit that stores therein user signature information in which biometric information of a user and a user electronic signature key that is a key for generating an electronic signature of the user for information created by the user are associated with each other and an encryption key that is a key for encrypting information, an electronic signature adding unit that, if the biometric information is obtained from the user, searches the storage unit for the user signature information corresponding to the biometric information, and adds the electronic signature of the user to user created information with a user electronic signature key in the user signature information, and an encrypt processing unit that encrypts with the encryption key the user created information processed by the electronic signature adding unit.

18 Claims, 11 Drawing Sheets

FIG.6

| PERIPHERAL DEVICE | | SOFTWARE | | EXECUTION PROGRAM | |
|---|---|---|---|---|---|
| PERIPHERAL DEVICE NAME | VERSION | SOFTWARE NAME | VERSION | PROGRAM NAME | VERSION |
| D1 | 1.1 | Sa | 5.0 | BIOMETRIC AUTHENTICATION | 2.5 |
| D2 | 3.2 | Sb | 4.1 | COMMUNICATION AUTHENTICATION | 1.0 |
| D3 | 1.0 | Sc | 1.0 | INNER-DEVICE INFORMATION AUTHENTICATION | 6.1 |
| ... | ... | ... | ... | ... | ... |

INFORMATION PROCESSING APPARATUS AND INFORMATION MANAGEMENT METHOD

CROSS-REFERENCE TO RELATED APPLICATIONS

This application is a continuation of PCT international application Ser. No. PCT/JP2006/318637 filed on Sep. 20, 2006 which designates the United States, incorporated herein by reference.

FIELD

The embodiments discussed herein are directed to an information processing apparatus including a chip implemented therein for independently performing a predetermined process.

BACKGROUND

In recent years, the Internet is widely used. Thus, a huge number of information processing apparatuses are connected to the Internet communication network, and transmit and receive information to and from each other. Increasing number of information processing apparatuses connected to communication networks poses a problem that safety of the information processing apparatuses and reliability of information transmitted and received thereamong are reduced.

Thus, to enhance safety of the information processing apparatuses, attempts have been made to incorporate a biometric authentication function utilizing fingerprint, iris, vein, and the like in the information processing apparatuses. It is preferable to first ensure safety before performing business transaction when engaging in electronic commerce by using the information processing apparatus. More specifically, it should be confirmed that a valid owner uses the information processing apparatus, the owner uses for the business transaction the information processing apparatus that the owner owns, and a device or software such as an operating system (OS), a browser, and plug-in software that may impair the safety is not installed in the information processing apparatus.

Besides the authentications described above, time authentication, user authentication, or device authentication utilizing an electronic signature technology is performed separately. In International Publication Pamphlet No. WO 2005/106620, an information management apparatus is proposed that can flexibly and strictly update a computer program and data for executing an authentication process.

In authentication performed in a conventional information processing apparatus or information processing system, time authentication, user authentication, and device authentication utilizing electronic signature technology are performed separately, and thus, it is problematic in that multiple authentication of "when", "who", and "from which device" can not be safely performed. Thus, it is very difficult to construct a system that can provide services which require multiple authentication, and such a service is yet to be provided.

SUMMARY

According to an aspect of the invention, an information processing apparatus includes a chip implemented therein to independently perform a predetermined process. The chip includes a storage unit that stores therein user signature information in which biometric information of a user and a user electronic signature key that is a key for generating an electronic signature of the user for information created by the user are associated with each other and an encryption key that is a key for encrypting information that is output from the chip to the information processing apparatus, an electronic signature adding unit that, if the biometric information is obtained from the user, searches the storage unit for the user signature information corresponding to the biometric information thus obtained, and adds the electronic signature of the user to user created information created by the user with a user electronic signature key in the user signature information thus found, and an encrypt processing unit that encrypts with the encryption key the user created information to which the electronic signature of the user is added by the electronic signature adding unit.

According to another aspect of an embodiment, an information processing apparatus includes a chip implemented therein to independently perform a predetermined process. The chip includes a storage unit that stores therein user signature information in which biometric information of a user and a user electronic signature key that is a key for generating an electronic signature of the user for information created by the user are associated with each other and a chip electronic signature key that is a key for generating an electronic signature of the chip, a first electronic signature adding unit that, if the biometric information is obtained from the user, searches the storage unit for the user signature information corresponding to the biometric information thus obtained, and adds the electronic signature of the user to user created information created by the user with a user electronic signature key in the user signature information thus found, and a second electronic signature adding unit that generates with the chip electronic signature key an electronic signature of the chip, and adds the electronic signature of the chip to the user created information to which the electronic signature of the user is added by the first electronic signature adding unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 6 is a schematic for explaining inner-device information stored in the memory/storage;

DESCRIPTION OF EMBODIMENT(S)

Exemplary embodiments of an information processing apparatus and an information management method according to the present invention are described below in detail with reference to the accompanying drawings.

[a] First Embodiment

Figure 1:
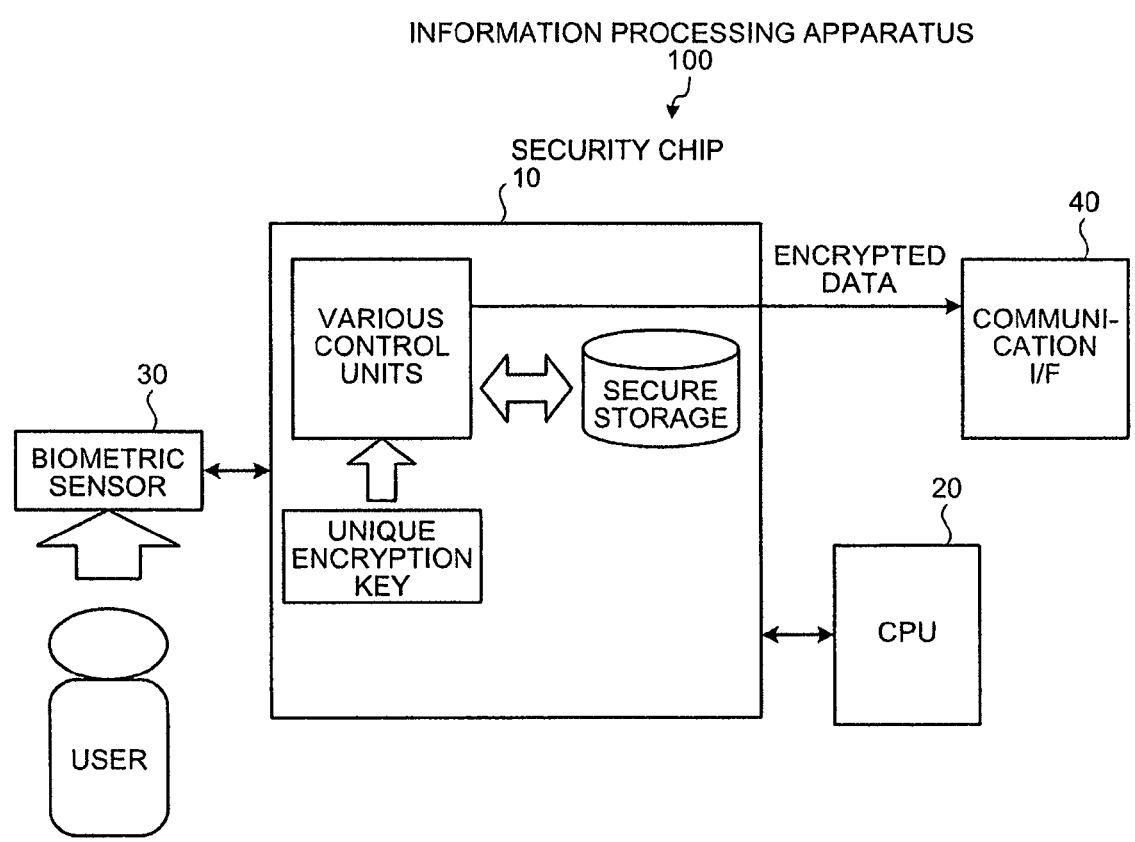
FIG. 1 is a schematic for explaining the general outlines and features of an information processing apparatus according to an embodiment of the present invention.

The general outlines and features of an information processing apparatus according to a first embodiment of the present invention is described below in detail. FIG. 1 is a schematic for explaining the general outlines and features of the information processing apparatus according to the present embodiment. As depicted in FIG. 1, an information processing apparatus 100 includes a security chip 10 (for example, an LSI having a biometric authentication function disclosed in International Publication No. 2005/106620 pamphlet) therein. The security chip 10 adds an electronic signature and performs encryption, separately from a central processing unit (CPU) 20 provided in the information processing apparatus 100.

More specifically, the security chip 10 stores in a secure storage (i.e., a safe storage means that prevents fraudulent writing from external sources) biometric information of the user (i.e., information about the user's fingerprint, iris, vein, facial configuration, and the like) and information of a key (hereinafter, "user electronic signature key") that is used to generate an electronic signature of the user in association with each other. If the security chip 10 obtains the biometric information of the user from a biometric sensor 30, various control units search the secure storage for a user electronic signature key corresponding to the obtained biometric information.

The various control units add the electronic signature of the user to user created information (the user created information is obtained, for example, via an input device (not shown)) by using the user electronic signature key thus found, encrypts the user created information by using the encryption key that is unique to the security chip 10, and transmits the user created information to a predetermined destination (for example, to a service-provider terminal that provides service) via a communication I/F 40.

Thus, in the information processing apparatus 100 according to the present embodiment, the security chip 10 adds the electronic signature of the user to information utilizing electronic signature technology, and encrypts the information by using the secret key that is unique to the security chip 10. Therefore, personal authentication and device authentication can be performed in a multiple manner, and a system that requires multiple authentication can be easily constructed.

Figure 2:
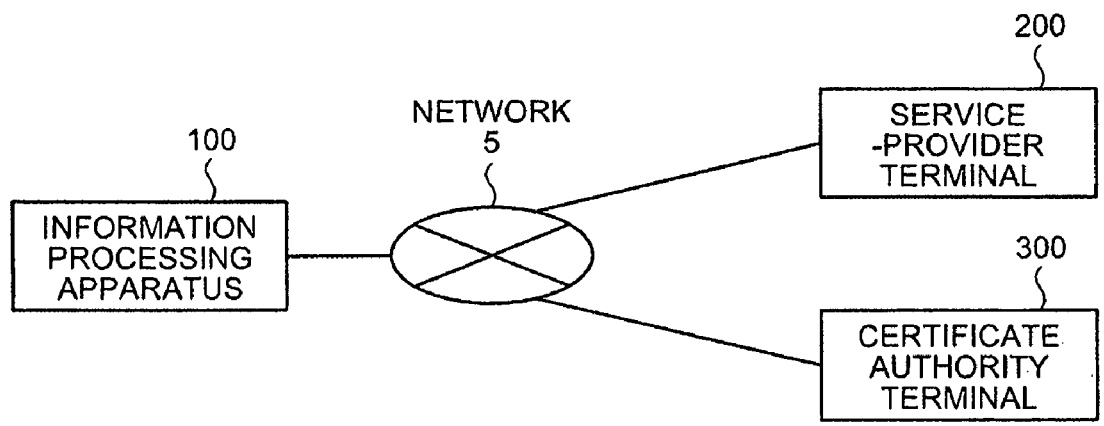
FIG. 2 is a schematic configuration diagram of an information management system according to the first embodiment.

Then, a general configuration of an information management system according to the first embodiment is described below in detail. FIG. 2 is a schematic configuration diagram of the information management system according to the present embodiment. As depicted in FIG. 2, in the information management system, the information processing apparatus 100 that the user owns, a service-provider terminal 200 that provides service to the information processing apparatus 100, and a certificate authority terminal 300 that is a terminal provided in a certificate authority are connected to each other via a network 5 such as the Internet.

The information processing apparatus 100 includes, for example, a mobile phone, a personal computer, a copier, a robot, and a household electrical device such as a refrigerator, a microwave oven, an air conditioner, a television, and a DVD player.

The service-provider terminal 200 is managed by, for example, a vendor or a maker that develop or sell execution programs and various data related to various services or a manufacturer or a distributor of the information processing apparatus 100. The service-provider terminal 200 provides various services to the information processing apparatus 100 in response to a service request from the information processing apparatus 100.

The certificate authority terminal 300 issues and manages an electronic certificate of the user, the maker, the vender, the distributor, and the like.

Figure 3:
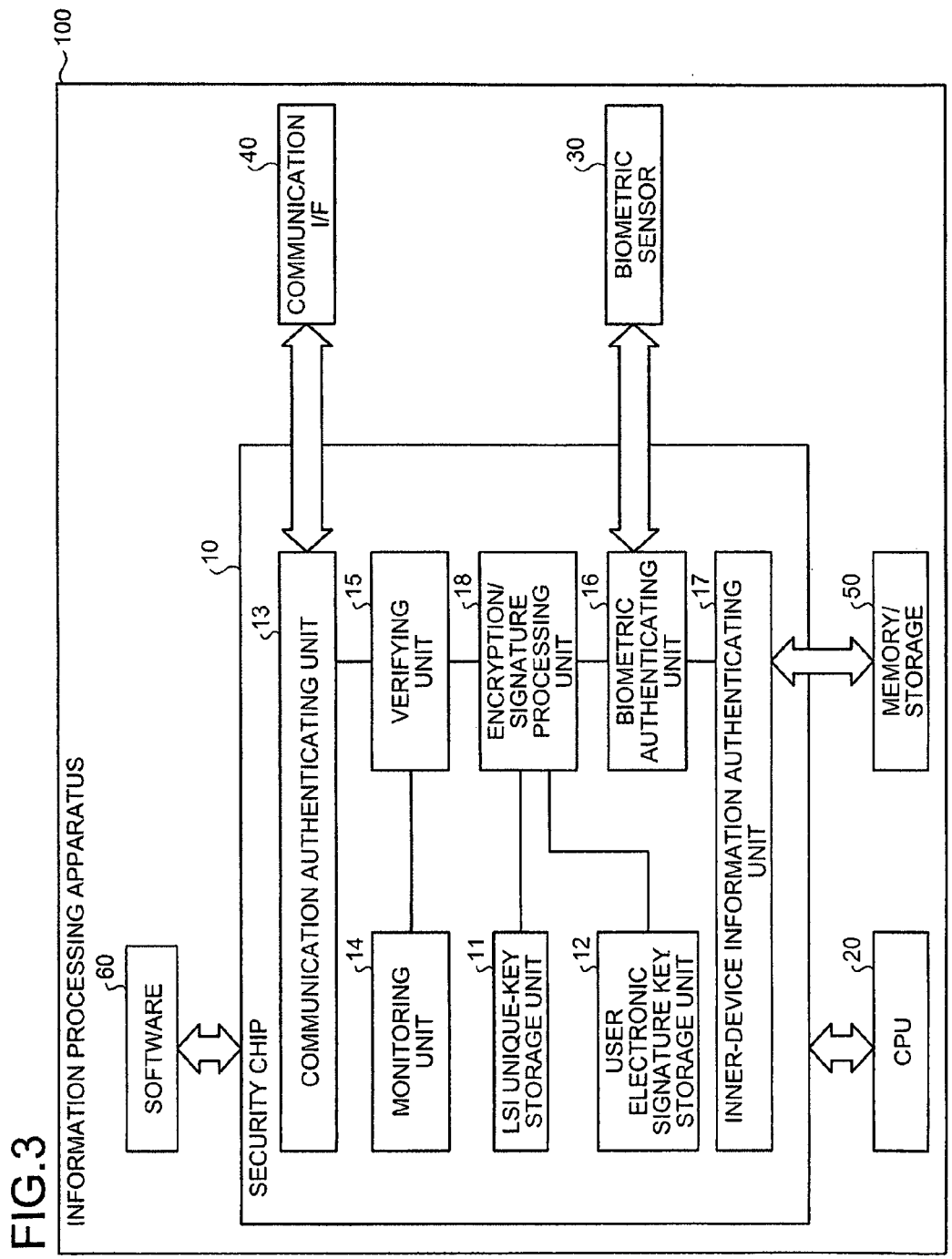
FIG. 3 is a functional block diagram of configuration of the information processing apparatus according to the first embodiment.

Specific configuration of the information processing apparatus 100 depicted in FIG. 2 is described below in detail. FIG. 3 is a functional block diagram of configuration of the information processing apparatus 100 according to the first embodiment. As depicted in FIG. 3, the information processing apparatus 100 includes the security chip 10, the CPU 20, the biometric sensor 30, the communication I/F 40, and a memory/storage 50. In the information processing apparatus 100, various types of software 60 are installed. Each of the devices and processing units in the information processing apparatus 100 can obtain information about the software 60, and can obtain various information from peripheral devices (not shown) connected to the information processing apparatus 100.

Before describing the security chip 10, the CPU 20, the biometric sensor 30, the communication I/F 40, and the memory/storage 50 are described below in detail.

The CPU 20 is a device that controls the process of the entire information processing apparatus. The biometric sensor 30 includes, for example, a fingerprint sensor, a camera, and a microphone. The fingerprint sensor is a device that detects asperities of fingerprints of a finger at approximately every 50 micrometers for conversion to an electric signal. As a fingerprint reading technique, a semiconductor type, an optical type, a pressure sensitive type, and a thermal type can be used, for example. The camera is a biometric sensor that takes a picture of the iris or the amphiblestrode of an eyeball. The microphone is a biometric sensor that detects voice patterns that characterize a voice.

The communication I/F 40 controls interface between the network 5 and the interior of the information processing apparatus 100. The communication I/F 40 also controls input/output of data to and from external devices. For example, a modem, a LAN (Local Area Network) adapter, and the like may be used as the communication I/F 40.

The memory/storage 50 is a storage device that stores various information used by the security chip 10. The memory/storage 50 may be provided inside or outside of the security chip 10, as long as the memory/storage 50 is provided within the information processing apparatus 100. If the memory/storage 50 is provided inside of the security chip 10, removing or tampering of the memory/storage 50 can be avoided.

Figure 4:
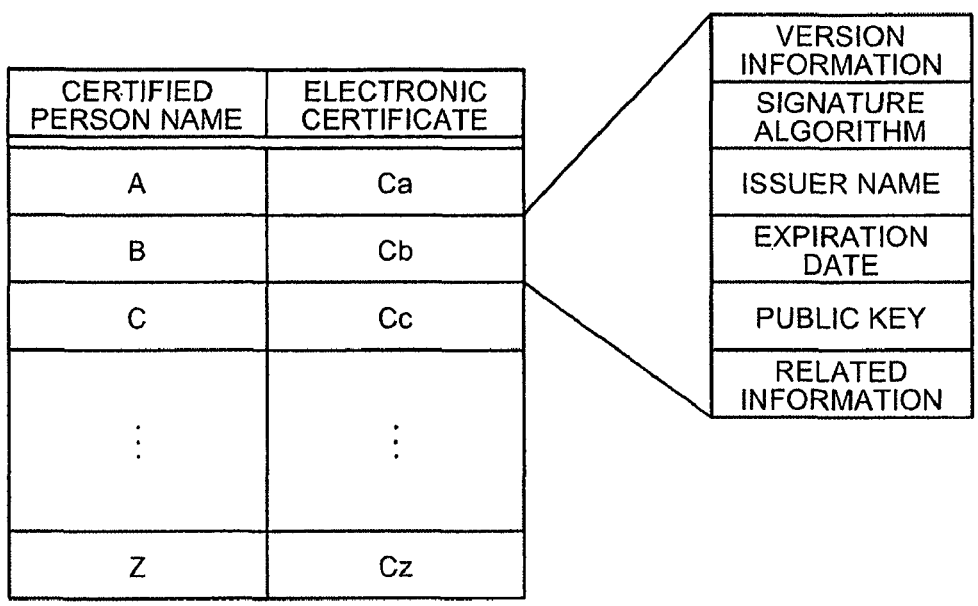
FIG. 4 is a schematic for explaining an electronic certificate stored in a memory/storage.
Figure 5:
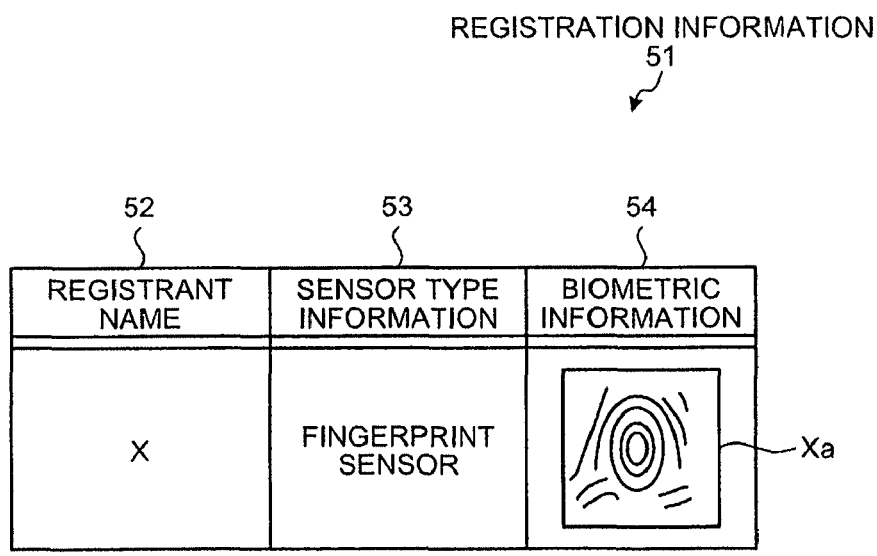
FIG. 5 is a schematic for explaining registration information stored in the memory/storage.

Storage contents of the memory/storage 50 are described below in detail. FIG. 4 is a schematic for explaining an electronic certificate stored in the memory/storage 50. FIG. 5 is a schematic for explaining registration information stored in the memory/storage 50. FIG. 6 is a schematic for explaining inner-device information stored in the memory/storage 50.

In FIG. 4, the electronic certificates Ca to Cz are stored in the memory/storage 50 for each of the certified persons. The "certified person" is a person who is certified by the electronic certificates Ca to Cz. The "certified person" includes, for example, the user, the maker, the vendor, and the certificate authority. Each of the electronic certificates Ca to Cz includes information such as version information, signature algorithm, the name of the issuer of the certificate, the expiration date, the public key, and other related information. The electronic certificates Ca to Cz are encrypted and stored by an inner-device information authenticating unit 17 included in the security chip 10.

In FIG. 5, registration information 51 includes a registrant name 52, sensor type information 53, and biometric information 54. In FIG. 5, as an example of the registration information 51, a registrant "X" that is the user registers graphic data "Xa" of the fingerprints of the "X" that is detected by a "fingerprint sensor" as the biometric information 54. The registration information 51 is encrypted and stored by the inner-device information authenticating unit 17 included in the security chip 10.

In FIG. 6, the names and the version information of the peripheral devices, the software 60, and the execution programs installed in the hardware are stored therein as inner-device information.

Now, the security chip 10 depicted in FIG. 3 is described below in detail. The security chip 10 is mounted on the main board of the information processing apparatus 100. The security chip 10 is a chip that provides only basic functions that ensure security and privacy. The security chip 10 is defined in the specification of the trusted computing group (TCG). The security chip 10 mounted on one information processing apparatus 100 can not be mounted on the other information processing apparatuses. If the security chip 10 is removed from the information processing apparatus 100, the information processing apparatus 100 can not be started.

The security chip 10 includes therein an LSI unique-key storage unit 11, a user electronic signature key storage unit 12, a communication authenticating unit 13, a monitoring unit 14, a verifying unit 15, a biometric authenticating unit 16, the inner-device information authenticating unit 17, and an encryption/signature processing unit 18.

The LSI unique-key storage unit 11 stores therein the public key and the secret key of the common key cryptography. The public key and the secret key stored by the LSI unique-key storage unit 11 are unique to each security chip 10. Below, the public key and the secret key stored by the LSI unique-key storage unit 11 are referred to as the LSI public key and the LSI secret key, respectively. The LSI public key is registered in the certificate authority terminal 300 depicted in FIG. 2, and the service-provider terminal 200 stores therein the electronic certificate of the security chip 10 and the LSI public key in association with each other.

Figure 7:
FIG. 7 is a schematic for explaining an example of a data structure of user electronic signature key information.

The user electronic signature key storage unit 12 is a storage unit that stores therein user electronic signature key information in which the biometric information of the user is associated with the public key and the secret key that are used for authenticate the user. FIG. 7 is a schematic for explaining an example of a data structure of the user electronic signature key information. As depicted in FIG. 7, the user electronic signature key information stores therein the user name, sensor type information, biometric information, a user public key that indicates the public key corresponding to the user, and a user secret key that indicates the secret key corresponding to the user in association with each other. The number of sets of the information described above is equal to the number of the users. The user public key is registered in the certificate authority terminal 300 depicted in FIG. 2, and the service-provider terminal 200 stores therein an electronic certificate of the user and the user public key in association with each other.

The communication authenticating unit 13 is a processing unit that ensures safety of communication with a terminal provided outside of the information processing apparatus 100, for example, the service-provider terminal 200 and the certificate authority terminal 300 depicted in FIG. 2. More specifically, the communication authenticating unit 13 performs user authentication based on an electronic certificate utilizing a certificate authority (i.e., public key infrastructure (PKI) authentication). Thus, the communication authenticating unit 13 can determine if a person that performs communication with external sources is officially registered by the certificate authority.

The monitoring unit 14 is a processing unit that monitors exchange of information performed inside of the information processing apparatus 100. The verifying unit 15 is a processing unit that verifies validity and performs matching verification of information that is input from external sources to the security chip 10 if safety of communication with the external sources is authenticated by the communication authenticating unit 13.

The biometric authenticating unit 16 is a processing unit that authenticate if the biometric information detected by the biometric sensor 30 and biometric information of the user registered in the memory/storage 50 (see FIG. 5) match each other. The biometric authenticating unit 16 can determine if an operator of the information processing apparatus 100 is an authenticated user.

The inner-device information authenticating unit 17 is a processing unit that authenticates information in the information processing apparatus 100 or in the security chip 10 (i.e., inner-device information). The inner-device information is referred to as environmental information, and includes information about the peripheral device (for example, the name and version information thereof) obtained from a peripheral device connected to the information processing apparatus 100, information about the software 60 installed in the information processing apparatus 100 (for example, the names and the version information thereof), and various information stored in the memory/storage 50 (for example, an electronic certificate).

The inner-device information authenticating unit 17 confidentially manages the information stored in the memory/storage 50. More specifically, the inner-device information authenticating unit 17 encrypts the information obtained thereby with a unique encryption key, and stores the information thus encrypted thereby in the memory/storage 50. When there is a call from the other hardware, the inner-device information authenticating unit 17 decrypts the encrypted information with the decryption key that makes a pair with the encryption key. Thus, by the encryption and the decryption processes, it can be authenticated that information is not tampered in the information processing apparatus 100.

If the encryption/signature processing unit 18 obtains information created by the user (the information requests a certain service from the service-provider terminal 200, and is created by the user. The information is referred to as user created information below. The user created information is input to the security chip 10 via a device such as the input device after the user is authenticated by the biometric authenticating unit 16), the encryption/signature processing unit 18 adds an electronic signature of the user to the user created information thus obtained, and encrypts the user created information to which the electronic signature of the user is added.

When the encryption/signature processing unit 18 obtains the biometric information from the user, the encryption/signature processing unit 18 compares the obtained biometric information with the biometric information corresponding to the electronic signature key information (i.e., the biometric information for the user authentication). Only if the comparison result is right (i.e., the user authentication is successfully performed), the encryption/signature processing unit 18 adds the electronic signature of the user thereto.

Processes performed by the encryption/signature processing unit 18 is described below more specifically. The encryption/signature processing unit 18 first obtains the user created information and the biometric information of the user, then, compares the obtained biometric information with the user electronic signature key information stored by the user electronic signature key storage unit 12, and searches for the user public key and the user secret key corresponding to the user.

The encryption/signature processing unit 18 generates a message digest from the user created information, and encrypts with the user secret key the generated message digest, thereby generating an electronic signature of the user. The encryption/signature processing unit 18 adds the electronic signature of the user that is generated thereby to the user created information. Then, the encryption/signature processing unit 18 obtains the LSI public key stored by the LSI unique-key storage unit 11, encrypts the user created information to which the electronic signature of the user is added, and transmits the encrypted user created information to the service-provider terminal 200.

The service-provider terminal 200 that receives the information encrypted by the encryption/signature processing unit 18 holds the decryption key corresponding to the encrypted encryption key in advance, and decrypts the information with the decryption key. The service-provider terminal 200 determines if the electronic signature of the user is appropriate or not. If the electronic signature of the user is appropriate, the service-provider terminal 200 provides a service corresponding to the user created information to the information processing apparatus 100 (the service-provider terminal 200 holds the information about the user public key and the electronic certificate in advance).

In the present embodiment, the encryption/signature processing unit 18 adds only an electronic signature of the user to the user created information. The present invention is, however, not limited thereto. Information about the time when the biometric information is processed (hereinafter, "time information") may also be added to the user created information (then, the encryption/signature processing unit 18 obtains information of time from, for example, a device embedded in the security chip 10 at the timing of obtaining the biometric information). Thus, by adding the time information thereto, the service-provider terminal 200 does not only authenticate the user, but also can process the biometric information and authenticate the time at which the user created information is sent to the service-provider terminal 200.

Figure 8:
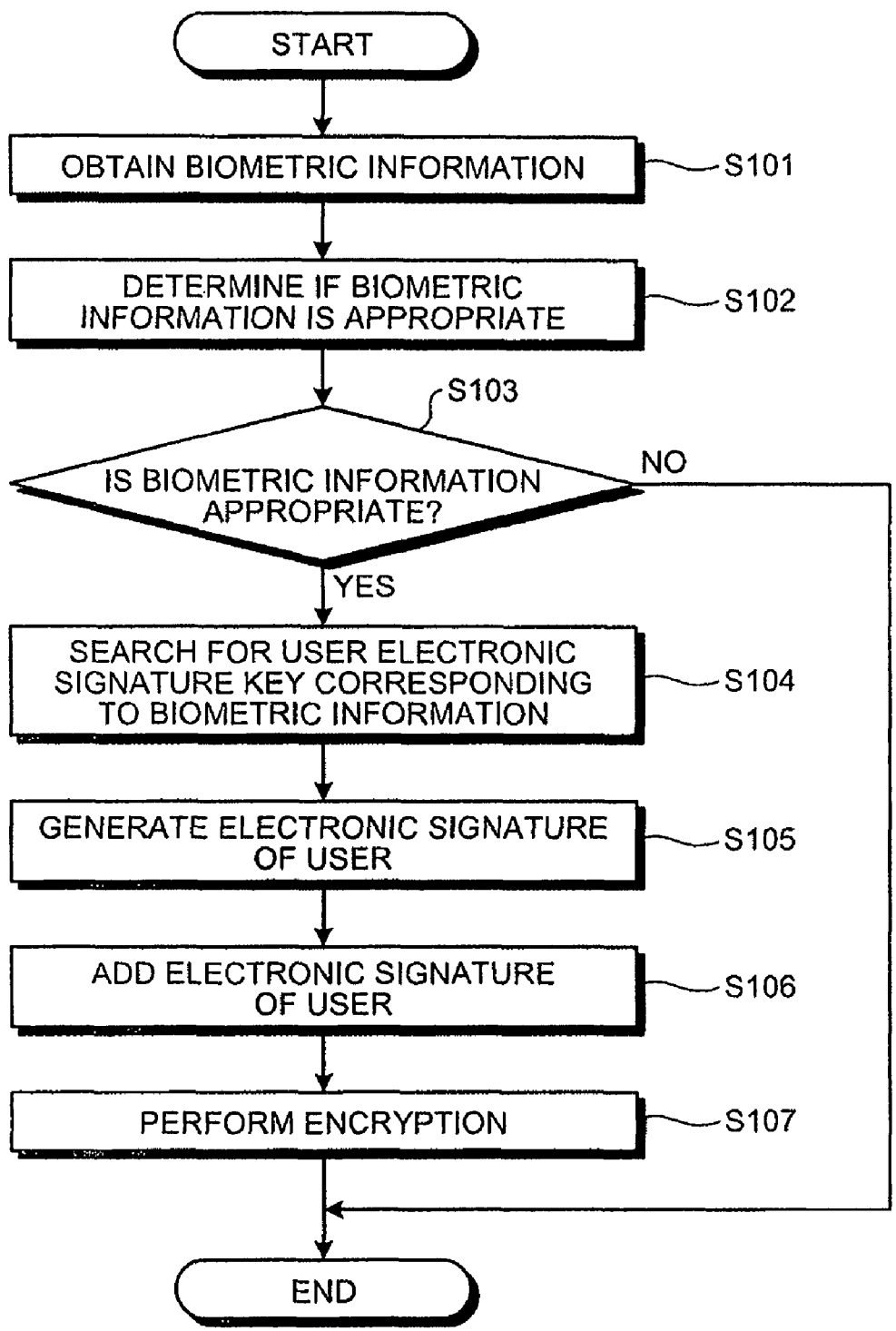
FIG. 8 is a flowchart of processing procedures of an encryption/signature process performed by a security chip according to the first embodiment.

Processing procedures of the encryption/signature process performed by the security chip 10 according to the first embodiment are described below in detail. FIG. 8 is a flowchart of the processing procedures of the encryption/signature process performed by the security chip 10 according to the first embodiment. As depicted in FIG. 8, the biometric authenticating unit 16 obtains the biometric information (Step S101), and the security chip 10 determines if the biometric information is appropriate (Step S02). If the biometric information is not determined to be appropriate (No at Step S103), the security chip 10 terminates the process.

On the other hand, if the biometric information is determined to be appropriate (Yes at Step S103), the encryption/signature processing unit 18 compares the biometric information with the user electronic signature key information stored in the user electronic signature key storage unit 12, searches for the user public key and the user secret key that correspond to the user (Step S104), and generates the electronic signature of the user (Step S105).

The encryption/signature processing unit 18 adds the electronic signature to the user created information (Step S106), obtains the LSI public key from the LSI unique-key storage unit 11, encrypts the user created information to which the electronic signature is added, and transmits the encrypted user created information to a destination (Step S107).

Thus, the encryption/signature processing unit 18 adds the electronic signature thereto, encrypts the user created information with the key that is unique to the security chip 10, and transmits the encrypted user created information to the destination (such as the service-provider terminal 200). Therefore, a plurality of authentication functions can be performed collectively.

As described above, in the information processing apparatus 100 according to the first embodiment, the security chip 10 stores in the user electronic signature key storage unit 12 the biometric information about the user (i.e., information about the user's fingerprint, iris, vein, facial configuration, and the like) and the information about the key for generating an electronic signature of the user (hereinafter, "user electronic signature key") in association with each other. If the biometric information of the user is obtained from the biometric sensor 30, then the security chip 10 searches for the key for generating the electronic signature corresponding to the biometric information obtained by the encryption/signature processing unit 18, adds the electronic signature of the user to the user created information with the key thus found, encrypts the user created information with the encryption key that is unique to the security chip 10, and transmits the user created information to the destination. Therefore, the personal authentication and the device authentication can be performed multiply, and a system that requires such multiple authentication can be easily constructed.

[b] Second Embodiment

Figure 9:
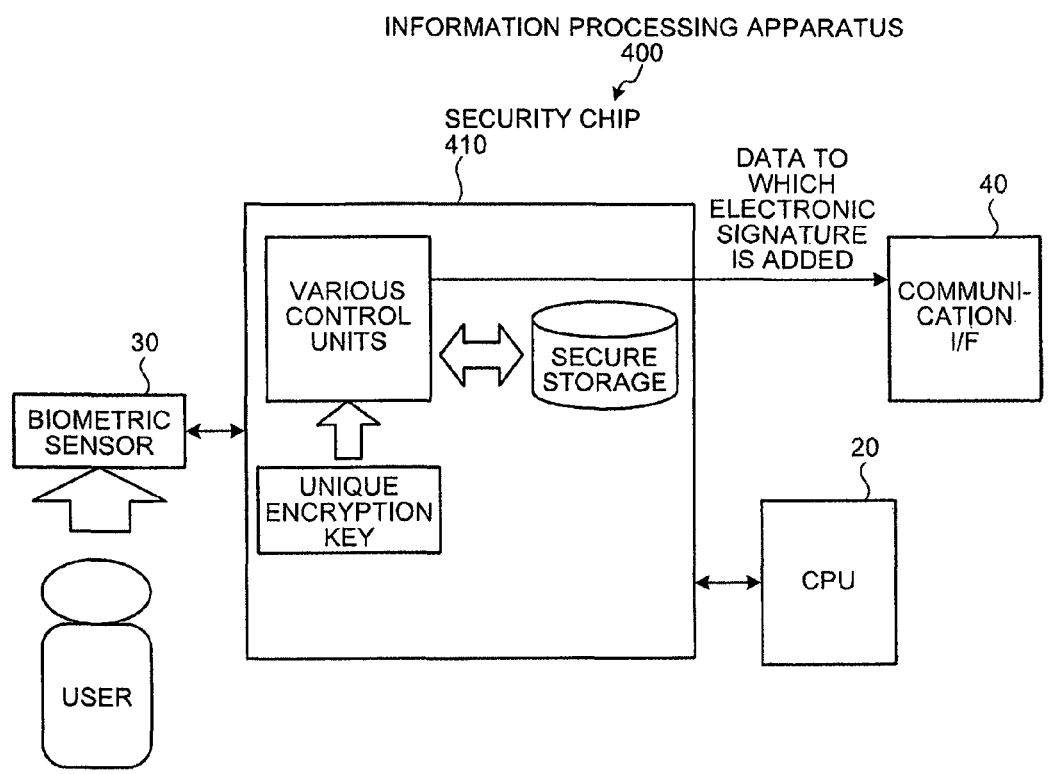
FIG. 9 is a schematic for explaining the general outlines and features of an information processing apparatus according to a second embodiment of the present invention.

The general outlines and features of an information processing apparatus according to a second embodiment of the present invention are described below in detail. FIG. 9 is a schematic for explaining the general outlines and features of the information processing apparatus according to the second embodiment. As depicted in FIG. 9, an information processing apparatus 400 includes a security chip 410 (for example, an LSI having a biometric authentication function disclosed in International Publication No. 2005/106620) therein. The security chip 410 generates electronic signatures of the user and the device (the security chip 410), separately from the CPU 20 in the information processing apparatus 400.

More specifically, the security chip 410 stores the biometric information of the user and information of the key for generating the electronic signature of the user (user electronic signature key) in a secure storage (i.e., a safe storage means that prevents fraudulent writing from external sources) in association with each other. If the biometric information of the user is obtained from the biometric sensor 30, various control units search the secure storage for the user electronic signature key corresponding to the obtained biometric information.

The various control units generate the electronic signature of the user with the user electronic signature key thus found, and adds the electronic signature of the user to the user created information. The various control units further adds a signature of the security chip 410 that indicates that processes are performed by the security chip 410 to the user created information with the encryption key that is unique to the security chip 410, and transmits the user created information to a predetermined destination (for example, a service-provider terminal that provides services) via the communication I/F 40.

Thus, in the information processing apparatus 400 according to the second embodiment, the security chip 410 adds the electronic signatures of the user and the security chip 410 to the user created information utilizing the electronic signature technology. Therefore, the personal authentication and the device authentication can be performed multiply, and reliability of information communication via the Internet can be enhanced.

Figure 10:
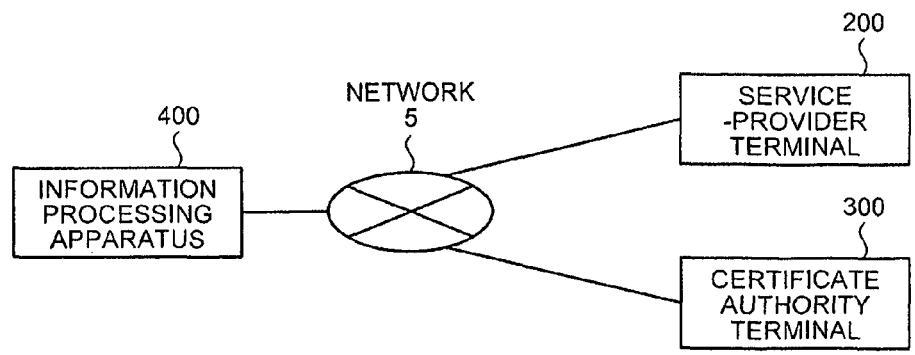
FIG. 10 is a schematic configuration diagram of an information management system according to the second embodiment.

Schematic configuration of the information management system according to the second embodiment is described below in detail. FIG. 10 is a schematic configuration diagram of the information management system according to the second embodiment. As depicted in FIG. 10, in the information management system, the information processing apparatus 400 that the user owns, the service-provider terminal 200 that provides services to the information processing apparatus 400, and the certificate authority terminal 300 that is a terminal provided in the certificate authority are connected to each other via the network 5 such as the Internet.

The information processing apparatus 400 includes, a mobile phone, a personal computer, a copier, a robot, and a household electrical device such as a refrigerator, a microwave oven, an air conditioner, a television, and a DVD player. The service-provider terminal 200 and the certificate authority terminal 300 are similar to the service-provider terminal 200 and the certificate authority terminal 300 depicted in FIG. 2, thus are denoted by the same reference numerals, and detailed description thereof will be omitted.

Figure 11:
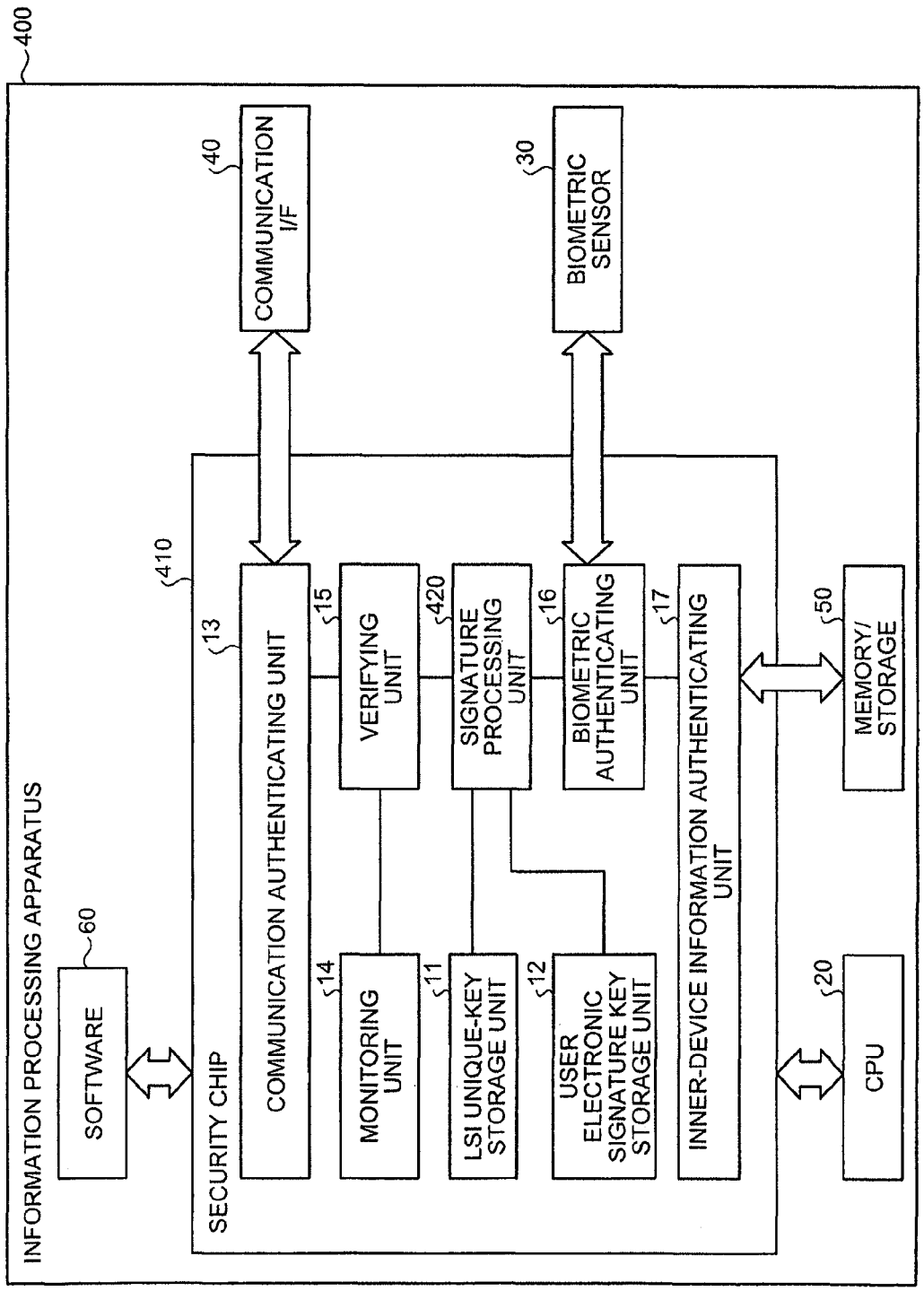
FIG. 11 is a functional block diagram of configuration of the information processing apparatus according to the second embodiment.

Specific configuration of the information processing apparatus 400 depicted in FIG. 10 is described below in detail. FIG. 11 is a functional block diagram of configuration of the information processing apparatus 400 according to the second embodiment. As depicted in FIG. 11, the information processing apparatus 400 includes the security chip 410, the CPU 20, the biometric sensor 30, the communication I/F 40, and the memory/storage 50. In the information processing apparatus 400, various types of software 60 are installed. The devices and the processing units in the information processing apparatus 400 can obtain information about the software 60. The devices and the processing units in the information processing apparatus 400 can obtain various information from peripheral devices (not shown) connected to the information processing apparatus 400.

The CPU 20, the biometric sensor 30, the communication I/F 40, and the memory/storage 50 are similar to the CPU 20, the biometric sensor 30, the communication I/F 40, and the memory/storage 50 depicted in FIG. 3, and are denoted by the same reference numerals, and detailed description thereof will be omitted.

The security chip 410 is mounted on the main board of the information processing apparatus 400. The security chip 410 is a chip that provides only basic functions that ensure security and privacy. The security chip 410 is defined in the specification of the trusted computing group (TCG). The security chip 410 mounted on one information processing apparatus 400 can not be mounted on the other information processing apparatuses. If the security chip 410 is removed from the information processing apparatus 400, the information processing apparatus 400 can not be started.

The security chip 410 includes therein the LSI unique-key storage unit 11, the user electronic signature key storage unit 12, the communication authenticating unit 13, the monitoring unit 14, the verifying unit 15, the biometric authenticating unit 16, the inner-device information authenticating unit 17, and a signature processing unit 420.

The LSI unique-key storage unit 11, the user electronic signature key storage unit 12, the communication authenticating unit 13, the monitoring unit 14, the verifying unit 15, the biometric authenticating unit 16, and the inner-device information authenticating unit 17 are similar to the LSI unique-key storage unit 11, the user electronic signature key storage unit 12, the communication authenticating unit 13, the monitoring unit 14, the verifying unit 15, the biometric authenticating unit 16, and the inner-device information authenticating unit 17 depicted in FIG. 3, and are denoted by the same reference numerals, and thus, detailed description thereof will be omitted.

The signature processing unit 420 is a processing unit that, if the user created information that the user created is obtained, adds electronic signatures of the user and the security chip 410 to the obtained user created information.

Processes performed by the signature processing unit 420 is described below in detail. The signature processing unit 420 obtains the user created information and biometric information of the user, then, compares the obtained biometric information with user electronic signature key information stored by the user electronic signature key storage unit 12, and searches for the user public key and the user secret key that correspond to the user.

The signature processing unit 420 generates a message digest from the user created information, and encrypts with the user secret key the generated message digest, thereby generating the electronic signature of the user. The signature processing unit 420 adds the electronic signature of the user that is generated thereby to the user created information. Then, the signature processing unit 420 obtains the LSI secret key stored by the LSI unique-key storage unit 11, generates a message digest from the user created information, encrypts the generated message digest with the LSI secret key, thereby generating the electronic signature of the security chip 410.

The signature processing unit 420 adds the electronic signature of the security chip 410 to the user created information to which the electronic signature of the user is added, and transmits to the service-provider terminal 200 the user created information to which the electronic signatures of the user and the security chip 410 are added.

The service-provider terminal 200 that receives the user created information to which the electronic signatures are added by the signature processing unit 420 holds the user public key and the LSI public key that correspond to the user and the security chip 410 in advance. With the public keys, the service-provider terminal 200 determines if the electronic signatures of the user and the security chip 410 are appropriate. If the electronic signatures of the user and the security chip 410 are determined to be appropriate, the service-provider terminal 200 provides to the information processing apparatus 400 services corresponding to the user created information.

In the present embodiment, the signature processing unit 420 adds only the electronic signatures of the user and the security chip 410 to the user created information. The present invention is, however, not limited thereto. Information about the time when the biometric information is processed (hereinafter, "time information") may also be added to the user created information (then, the signature processing unit 420 obtains information of time from, for example, a device embedded in the security chip 410 at the timing of obtaining the biometric information). Thus, by adding the time information thereto, the service-provider terminal 200 does not only authenticate the user, but also can process the biometric information and authenticate the time at which the user created information is sent to the service-provider terminal 200.

Figure 12:
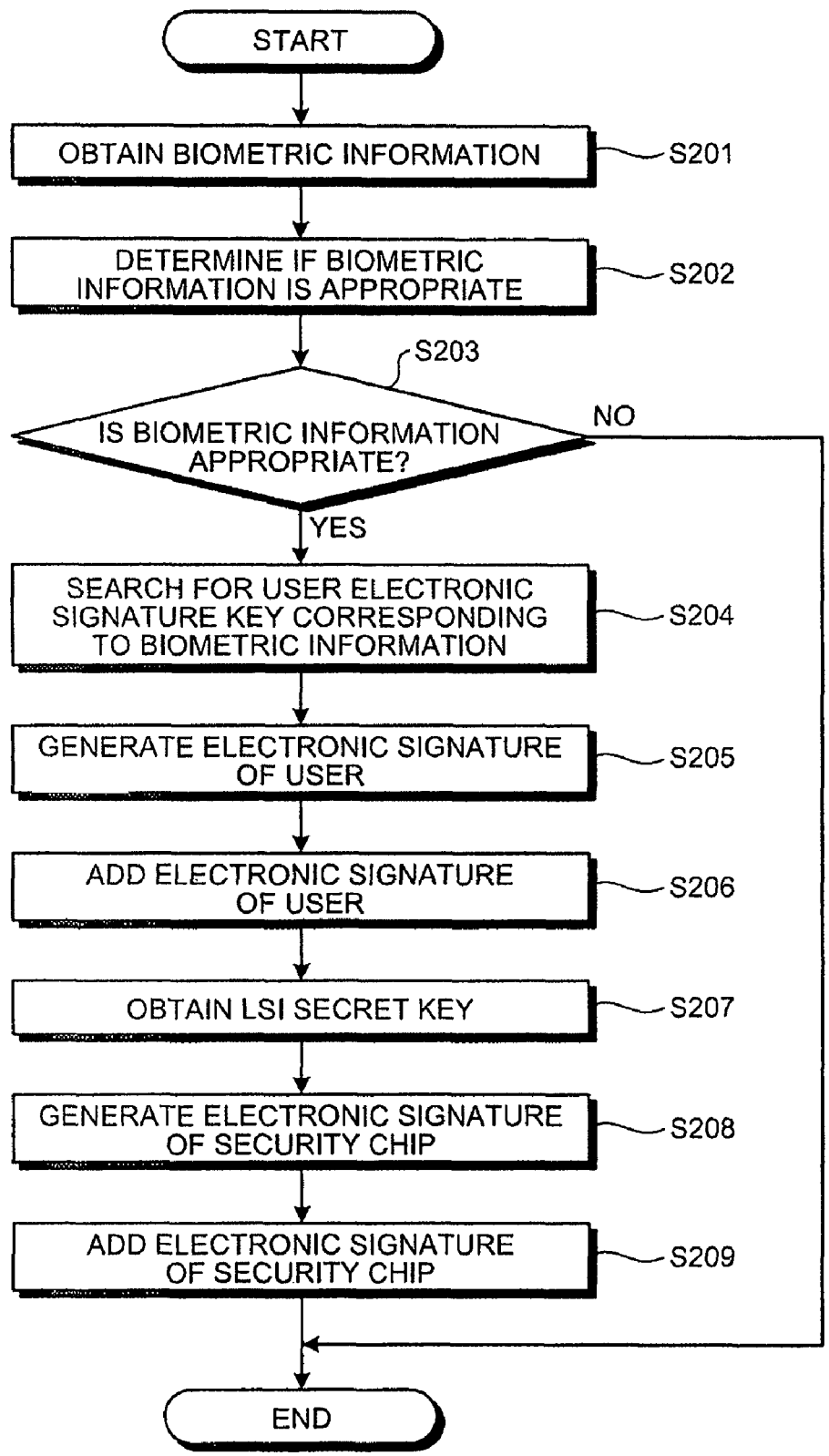
FIG. 12 is a flowchart of processing procedures of a signature generating process performed by a security chip according to the second embodiment.

Processing procedures of the signature generating process performed by the security chip 410 according to the second embodiment are described below in detail. FIG. 12 is a flowchart of the processing procedures of the signature generating process performed by the security chip 410 according to the second embodiment. As depicted in FIG. 12, the biometric authenticating unit 16 obtains the biometric information (Step S201), and the security chip 410 determines if the biometric information is appropriate (Step S202). If the biometric information is not determined to be appropriate (No at Step S203), the security chip 10 terminates the process.

On the other hand, if the biometric information is determined to be appropriate (Yes at Step S203), the signature processing unit 420 compares the biometric information with the user electronic signature key information stored in the user electronic signature key storage unit 12, searches for the user public key and the user secret key that correspond to the user (Step S204), and generates the electronic signature of the user (Step S205).

The signature processing unit 420 adds the electronic signature of the user to the user created information (Step S206), obtains the LSI secret key from the LSI unique-key storage unit 11 (Step S207), and thus, generates the electronic signature of the security chip 410 (Step S208).

Then, the signature processing unit 420 adds the electronic signature of the security chip 410 to the user created information, and transmits the user created information to a destination (Step S209).

Thus, the signature processing unit 420 generates the electronic signatures of the user and security chip 410, and adds to the user created information the electronic signatures thus generated, and transmits the user created information to the destination (such as the service-provider terminal 200). Therefore, a plurality of authentication processes can be efficiently performed.

As described above, in the information processing apparatus 400 according to the second embodiment, the security chip 410 stores in the user electronic signature key storage unit 12 the biometric information of the user (i.e., the information about the user's fingerprint, iris, vein, facial configuration, and the like) and information of the key for generating the electronic signature of the user (hereinafter, "user electronic signature key") in association with each other. If the biometric information of the user is obtained from the biometric sensor 30, then the security chip 410 searches for the key for generating the electronic signature of the user corresponding to the biometric information obtained by the signature processing unit 420, adds the electronic signature of the user to the user created information with the key thus found, generates the electronic signature of the security chip 410 with the key that is unique to the security chip 10, adds the electronic signature of the security chip 410 to the user created information, and transmits the user created information to the destination. Therefore, the personal authentication and the device authentication can be performed multiply, and a system that requires such multiple authentication can be easily constructed.

If the integrative authentication function described in the first and second embodiments are utilized, the service provider can enhance security of contents that are delivered when services are provided by utilizing LSI public key recorded in the security chips 10 and 410.

For example, after the service-provider terminal 200 obtains the user created information (which includes the electronic signatures of the user and the security chips 10 or 410) from the information processing apparatuses 100 or 400, and the service-provider terminal 200 confirms that the communication is a predetermined event by verifying the electronic signatures, the service-provider terminal 200 delivers the contents encrypted by the LSI public key to the information processing apparatus 100 or 400.

If the information processing apparatus 100 or 400 receives the encrypted content delivery, the information processing apparatus 100 or 400 decrypts the content with the LSI secret key that is unique to the security chips 10 or 410. If a fraudulent service request is performed (for example, if a malicious third party pretends to be a user, transmits user created information to the service-provider terminal 200, and receives contents by a terminal that is not the information processing apparatus 100 or 400), contents delivered from the service-provider terminal 200 can not be decrypted, whereby the contents can be protected.

Figure 13:
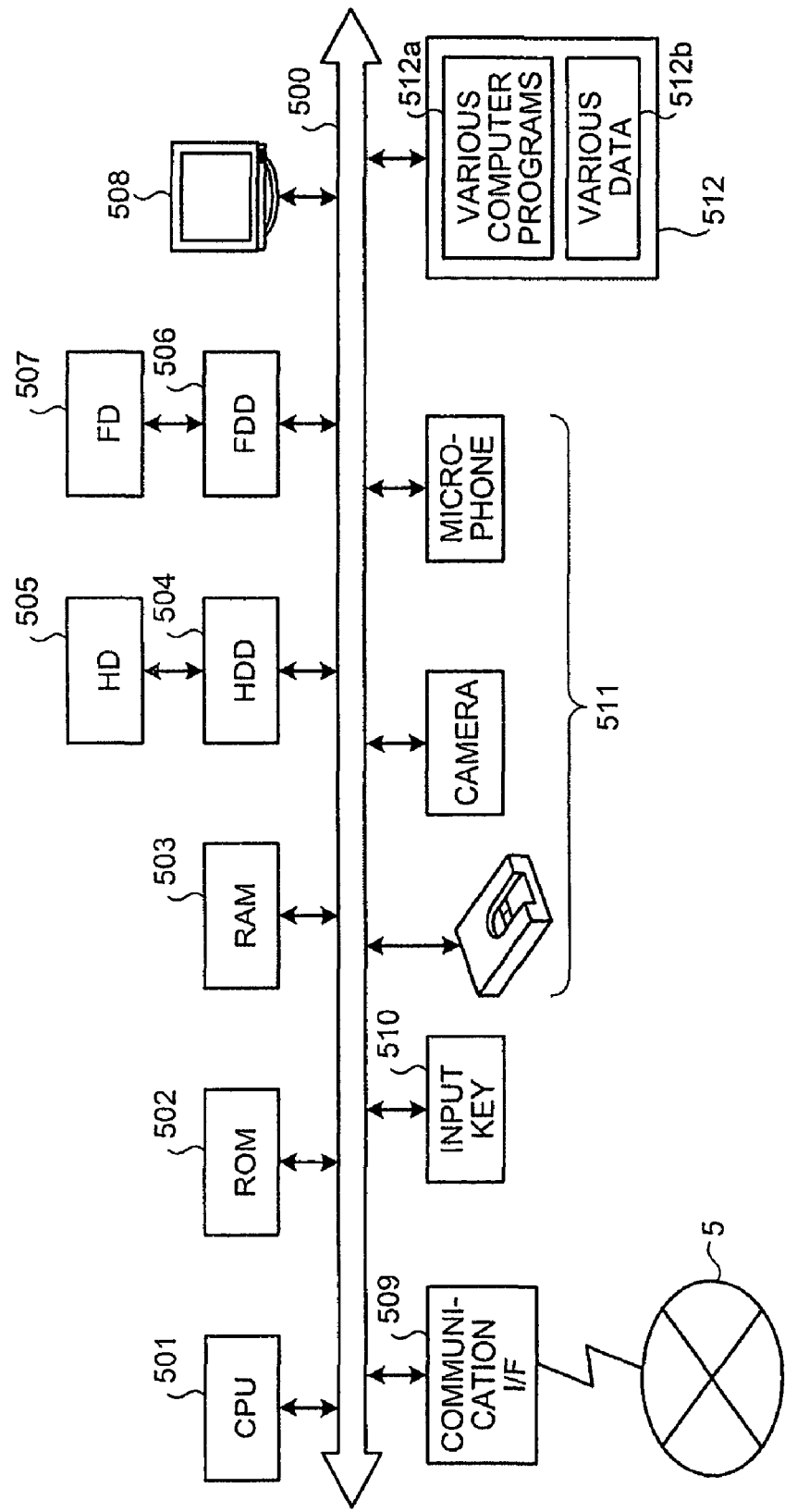
FIG. 13 is a schematic of a hardware configuration of the information processing apparatus.

Hardware configuration of the information processing apparatus according to the first and second embodiments is described below in detail. FIG. 13 is a schematic of the hardware configuration of the information processing apparatus. In FIG. 13, the information processing apparatus includes a CPU 501, a ROM 502, a RAM 503, a hard disk drive (HDD) 504, a hard disk (HD) 505, a flexible disk drive (FDD) 506, a flexible disk (FD) 507, a display 508, a communication I/F 509, an input key (such as a keyboard and a mouse) 510, a biometric sensor 511, and a security chip 512. The components are each connected to a bus 500.

The CPU 501 controls the entire information processing apparatus. The ROM 502 stores therein computer programs such as a boot program. The RAM 503 is used as a work area of the CPU 501. The HDD 504 controls data read or written from or to the HD 505 according to control of the CPU 501. The HD 505 stores therein the data written according to control of the HDD 504.

The FDD 506 controls data reading and data writing from and to the FD 507 according to control of the CPU 501. The FD 507 stores data written according to control of the FDD 506, and makes the information processing apparatus read the data stored in the FD 507.

As a detachable recording medium, a CD-ROM (CD-R or CD-RW), an MO, a digital versatile disk (DVD), or a memory card may be used besides the FD 507. The display 508 displays a cursor, an icon, a tool box, various data such as texts, graphics, and functional information. For example, a CRT, a TFT liquid crystal display, and a plasma display may be adapted as the display 508.

The communication I/F 509 corresponds to the communication I/F 40 depicted in FIG. 3. The input key 510 includes keys for inputting texts, numerals, and various instructions, and is used for inputting data. The input key 510 may also be a touch panel type input pad or a numeric keypad.

The biometric sensor 511 and the security chip 512 correspond to the biometric sensor 30 and the security chip 10 (or the security chip 410) depicted in FIG. 3, respectively. Various computer programs 512a that implement the various processing units depicted in FIG. 3 (or FIG. 11) are stored in the security chip 512, and by the computer programs 512a, the various processes are executed. The various processes correspond to the communication authenticating unit 13, the monitoring unit 14, the verifying unit 15, the biometric authenticating unit 16, the inner-device information authenticating unit 17, and the encryption/signature processing unit 18 depicted in FIG. 3. In the security chip 512, various data 512b that is utilized when the various processes are performed (corresponding to the biometric information, the inner-device information, LSI unique key information, and the like described in the embodiments) are stored.

Embodiments of the present invention has been described above in detail. The present invention, however, may be embodied in various other embodiments besides the embodiments described above without deviating from the scope of technical idea represented by the claims.

Among the procedures described in the present embodiment, all or some of the processes that are described to be executed automatically may also be executed manually. On the other hand, all or some of the processes that are described to be executed manually may also be executed automatically by using a known method.

Further, processing procedures, control procedures, specific names, information including various data and parameters that are included in the descriptive portion above or in the drawings may be arbitrarily modified unless otherwise indicated.

Respective configuration elements of the respective illustrated devices shown in the drawings are functionally conceptual and are not always physically configured as illustrated. Specifically, a specific pattern into which the devices are dispersed or integrated is not limited to the illustrated pattern. The devices may be configured by functionally or physically dispersing or integrating all or some of the devices on any unit depending on various loads or usages.

According to an embodiment, a chip that independently performs a predetermined process stores therein user signature information and an encryption key. Here, in the user signature information, biometric information of a user and a user electronic signature key that is used to create an electronic signature of the user for information created by the user are associated with each other, and the encryption key is a key that is used to encrypt information that is output from the chip to the information processing apparatus. If the chip obtains biometric information from the user, the chip searches for the user signature information corresponding to the obtained biometric information, adds the electronic signature of the user to the user created information by using the user electronic signature key in the user signature information that is thus found, and then, encrypts by using the encryption key the user created information to which the electronic signature of the user is added. Therefore, multiple authentication can be safely performed.

According to an embodiment, time information that is information about the time when the biometric information is obtained is further added to the user created information, and then, the user created information to which the time information and the electronic signature of the user are added is encrypted. Therefore, safety of the multiple authentication can be further enhanced.

According to an embodiment, the chip stores therein a public key and a secret key in the public key cryptosystem. If the chip obtains information that is encrypted by using the public key, the chip decrypts the encrypted information by using the secret key. Therefore, safety of the information provided by external sources can be enhanced.

According to an embodiment, the chip that independently performs a predetermined process stores therein the user signature information in which biometric information of the user and the user electronic signature key that is used to generate the electronic signature of the user for the user created information are associated with each other and a chip electronic signature key that is used to generate the electronic signature of the chip. If the chip obtains the biometric information from the user, the chip searches for the user signature information corresponding to the obtained biometric information, adds the electronic signature of the user to the user created information by using the user electronic signature key in the user signature information thus found, generates an electronic signature key of the chip by using the chip electronic signature, and then, adds the electronic signature of the chip to the user created information to which the electronic signature of the user is added. Therefore, multiple authentication can be safely performed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus comprising:
    a chip implemented in the information processing apparatus to independently perform a predetermined process, the chip including:
        a storage unit that stores user signature information including biometric information of a user in association with a key for generating an electronic signature of the user for information created by the user and an encryption key that is unique to the chip for encrypting information that is output from the chip to the information processing apparatus;
        an electronic signature adding unit that, when obtaining the biometric information and the information created by the user, searches the user signature information corresponding to the biometric information obtained, generates a message digest from the information created by the user, encrypts the message digest with the key found in the user signature information to generate the electronic signature of the user, and adds the electronic signature of the user to the information created by the user; and
        an encrypt processing unit that encrypts the information created by the user with the encryption key that is unique to the chip, where the information created by the user is transmitted to a destination with the electronic signature of the user added.

2. The information processing apparatus according to claim 1, wherein the electronic signature adding unit adds time information to the information created by the user, the time information being information of a time at which the biometric information is obtained, and the encrypt processing unit encrypts the information created by the user to which the time information and the electronic signature of the user are added.

3. The information processing apparatus according to claim 1, wherein the storage unit stores a public key and a secret key based on a public key cryptosystem, and the chip includes a decrypting unit that decrypts, with the secret key, information that is encrypted when the information that is encrypted with the public key is obtained from an external source.

4. An information processing apparatus comprising:

a chip implemented in the information processing apparatus to independently perform a predetermined process, the chip including:

a storage unit that stores user signature information including biometric information of a user in association with a key for generating an electronic signature of the user for information created by the user and a chip electronic signature key that is unique to the chip for generating an electronic signature of the chip;

a first electronic signature adding unit that, when the biometric information and the information created by the user are obtained from the user, searches the user signature information corresponding to the biometric information obtained, generates a message digest from the information created by the user, encrypts the message digest with the key found in the user signature information to generate the electronic signature of the user, and adds the electronic signature of the user to the information created by the user; and a second electronic signature adding unit that generates with the chip electronic signature key that is unique to the chip, the electronic signature of the chip, and adds the electronic signature of the chip to the information created by the user to which the electronic signature of the user is added by the first electronic signature adding unit.

5. The information processing apparatus according to claim 4, wherein the second electronic signature adding unit adds time information to the information created by the user, the time information being information of a time at which the biometric information is obtained.

6. The information processing apparatus according to claim 4, wherein the storage unit stores a public key and a secret key based on a public key cryptosystem, and the chip includes a decrypting unit that decrypts, with the secret key, information that is encrypted if the information that is encrypted with the public key is obtained from an external source.

7. An information managing method for an information processing apparatus including a chip implemented in the information processing apparatus to independently perform a predetermined process, the method comprising:

storing, in a storage unit by the chip, user signature information including biometric information of a user in association with a key for generating an electronic signature of the user for information created by the user and an encryption key that is unique to the chip for encrypting information that is output from the chip to the information processing apparatus;

searching, by the chip, when obtaining the biometric information and the information created by the user, the storage unit for the user signature information corresponding to the biometric information obtained;

generating, by the chip, a message digest from the information created by the user;

encrypting, by the chip, the message digest with the key found in the user signature information and generating an electronic signature of the user;

adding, by the chip, the electronic signature of the user to the information created by the user; and encrypting, by the chip, with the encryption key that is unique to the chip, the information created by the user, where the information created by the user is transmitted to a destination with the electronic signature of the user added.

8. The information managing method according to claim 7, wherein the adding includes adding time information to the information created by the user, the time information being information of a time at which the biometric information is obtained, and the encrypting includes encrypting the information created by the user to which the time information and the electronic signature of the user are added.

9. The information managing method according to claim 7, comprising:

storing a public key and a secret key based on a public key cryptosystem in the storage unit, and decrypting in the chip, with the secret key, information that is encrypted when the information that is encrypted with the public key is obtained from an external source.

10. An information managing method for an information processing apparatus including a chip implemented in the information processing apparatus to independently perform a predetermined process, the method comprising:

storing, in a storage unit by the chip, user signature information having biometric information of a user in association with a key for generating an electronic signature of the user for information created by the user and a chip electronic signature key that is unique to the chip and is a key for generating an electronic signature of the chip;

searching, by the chip, when obtaining the biometric information and the information created by the user, the storage unit for the user signature information corresponding to the biometric information obtained;

generating, by the chip, a message digest from the information created by the user;

encrypting, by the chip, the message digest with the key found in the user signature information and generating the electronic signature of the user;

adding by the chip, the electronic signature of the user to the information created by the user; and adding by the chip, the electronic signature of the chip, by generating with the chip electronic signature key, the electronic signature of the chip, and adding the electronic signature of the chip to the information created by the user to which the electronic signature of the user is added.

11. The information managing method according to claim 10, wherein the adding includes adding time information to the information created by the user, the time information being information of a time at which the biometric information is obtained.

12. The information managing method according to claim 10, wherein the storing includes storing a public key and a secret key based on a public key cryptosystem in the storage unit, and the method includes decrypting in the chip, with the secret key, information that is encrypted if the information that is encrypted with the public key is obtained from an external source.

13. A non-transitory computer readable storage medium containing instructions that, when executed by a computer, causes the computer to perform an information managing program for an information processing apparatus including a chip implemented in the information processing apparatus to independently perform a predetermined process, the program causes the chip to execute:

storing in a storage unit, user signature information including biometric information of a user in association with a key for generating an electronic signature of the user for information created by the user and an encryption key that is unique to the chip and is a key for encrypting information that is output from the chip to the information processing apparatus;

searching, when obtaining the biometric information and the information created by the user are obtained from the user, the storage unit for the user signature information corresponding to the biometric information obtained;

generating a message digest from the information created by the user;

encrypting the message digest with the key found in the user signature information and generating an electronic signature of the user;

adding the electronic signature of the user to the information created by the user; and encrypting, with the encryption key that is unique to the chip, the information created by the user, where the information created by the user is transmitted to a destination with the electronic signature of the user added.

14. The non-transitory computer readable storage medium according to claim 13, wherein the adding includes adding time information to the information created by the user, the time information being information of a time at which the biometric information is obtained, and the encrypting includes encrypting the information created by the user to which the time information and the electronic signature of the user are added.

15. The non-transitory computer readable storage medium according to claim 13, comprising:

storing a public key and a secret key based on a public key cryptosystem in the storage unit, and decrypting, with the secret key, information that is encrypted if the information that is encrypted with the public key is obtained from an external source.

16. A non-transitory computer readable storage medium containing instructions that, when executed by a computer, causes the computer to perform an information managing program for an information processing apparatus including a chip implemented in the information processing apparatus to independently perform a predetermined process, the program causes the chip to execute:

storing in a storage unit, user signature information including biometric information of a user in association with a key for generating an electronic signature of the user for information created by the user and a chip electronic signature key that is unique to the chip and is a key for generating an electronic signature of the chip;

searching, when obtaining the biometric information and the information created by the user, the storage unit for the user signature information corresponding to the biometric information obtained;

generating a message digest from the information created by the user;

encrypting the message digest with the key found in the user signature information, and generating the electronic signature of the user;

adding the electronic signature of the user to the information created by the user with the electronic signature key found in the user signature information; and adding an electronic signature of the chip, by generating with the chip electronic signature key that is unique to the chip, the electronic signature of the chip, and adding the electronic signature of the chip to the information created by the user to which the electronic signature of the user is added.

17. The non-transitory computer readable storage medium according to claim 16, comprising:

adding time information to the information created by the user, the time information being information of a time at which the biometric information is obtained.

18. The non-transitory computer readable storage medium according to claim 16, comprising:

storing a public key and a secret key based on a public key cryptosystem in the storage unit, and decrypting, with the secret key, information that is encrypted if the information that is encrypted with the public key is obtained from an external source.

* * * * *

UNITED STATES PATENT AND TRADEMARK OFFICE
CERTIFICATE OF CORRECTION

PATENT NO. : 8,386,796 B2
APPLICATION NO. : 12/382685
DATED : February 26, 2013
INVENTOR(S) : Masato Suzuki et al.

It is certified that error appears in the above-identified patent and that said Letters Patent is hereby corrected as shown below:

In the Claims

Column 16, Line 4, In Claim 7, delete "user ," and insert -- user, --, therefor.
Column 18, Line 22, In Claim 16, delete "an" and insert -- the --, therefor.

Signed and Sealed this
Twenty-eighth Day of May, 2013

Teresa Stanek Rea
*Acting Director of the United States Patent and Trademark Office*